(12) United States Patent
Park et al.

(10) Patent No.: US 11,018,340 B2
(45) Date of Patent: May 25, 2021

(54) NEGATIVE ELECTRODE FOR RECHARGEABLE LITHIUM BATTERY AND RECHARGEABLE LITHIUM BATTERY INCLUDING SAME

(71) Applicant: SAMSUNG SDI CO., LTD., Yongin-si (KR)

(72) Inventors: Yoonsoo Park, Yongin-si (KR); Taesik Kim, Yongin-si (KR); Jae-Hyeon Eom, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 218 days.

(21) Appl. No.: 16/390,357

(22) Filed: Apr. 22, 2019

(65) Prior Publication Data

US 2019/0326600 A1    Oct. 24, 2019

(30) Foreign Application Priority Data

Apr. 24, 2018   (KR) .................. 10-2018-0047416

(51) Int. Cl.
*H01M 4/587* (2010.01)
*H01M 4/58* (2010.01)
(Continued)

(52) U.S. Cl.
CPC ......... *H01M 4/587* (2013.01); *H01M 10/052* (2013.01); *H01M 2004/021* (2013.01); *H01M 2004/027* (2013.01)

(58) Field of Classification Search
CPC .......... H01M 4/587; H01M 4/13; H01M 4/58; H01M 10/052
See application file for complete search history.

(56) References Cited

U.S. PATENT DOCUMENTS

| 2011/0281180 A1* | 11/2011 | Kim ................. H01M 4/134 |
| | | 429/338 |
| 2015/0118566 A1* | 4/2015 | Toda ................. H01M 4/587 |
| | | 429/231.4 |

(Continued)

FOREIGN PATENT DOCUMENTS

| KR | 10-2012-0096898 A | 8/2012 |
| KR | 10-2014-0099988 A | 8/2014 |
| KR | 10-2014-0139355 A | 12/2014 |

OTHER PUBLICATIONS

Machine Translation of: KR 10-2012-0096898, Gu, Aug. 14, 2014.*
Machine Translation of: KR 10-2014-0139355, Woo, Dec. 5, 2014.*

*Primary Examiner* — Kenneth J Douyette
(74) *Attorney, Agent, or Firm* — Lee IP Law, PC

(57) ABSTRACT

A negative electrode for a rechargeable lithium battery includes a negative active material layer including a negative active material, and a current collector supporting the negative active material layer. The negative active material may include first spherical crystalline carbon, the first spherical crystalline carbon including secondary particles in which primary particles of crystalline carbon are assembled, the first spherical crystalline carbon having a coating of crystalline carbon, second spherical crystalline carbon, the second spherical crystalline carbon including secondary particles in which primary particles of crystalline carbon are assembled, the second spherical crystalline carbon having a coating of amorphous carbon, and flake-shaped graphite.

12 Claims, 9 Drawing Sheets

(51) Int. Cl.
*H01M 10/052* (2010.01)
*H01M 4/02* (2006.01)

(56) References Cited

U.S. PATENT DOCUMENTS

| 2015/0270575 A1* | 9/2015 | Nishie | H01M 4/587 |
| | | | 429/200 |
| 2016/0204431 A1* | 7/2016 | Sawa | H01M 4/366 |
| | | | 429/218.1 |

* cited by examiner

NEGATIVE ELECTRODE FOR RECHARGEABLE LITHIUM BATTERY AND RECHARGEABLE LITHIUM BATTERY INCLUDING SAME

CROSS-REFERENCE TO RELATED APPLICATION

Korean Patent Application No. 10-2018-0047416, filed on Apr. 24, 2018, in the Korean Intellectual Property Office, and entitled: "Negative Active Material for Rechargeable Lithium Battery and Rechargeable Lithium Battery Including Same," is incorporated by reference herein in its entirety.

BACKGROUND

1. Field

Embodiments relate to a negative electrode for a rechargeable lithium battery and a rechargeable lithium battery including the same.

2. Description of the Related Art

Technology development for realizing high capacity of a rechargeable lithium battery has been continuously made due to an increasing demand on a mobile equipment or a portable battery.

SUMMARY

Embodiments are directed to a negative electrode for a rechargeable lithium battery, including a negative active material layer including a negative active material, and a current collector supporting the negative active material layer. The negative active material may include first spherical crystalline carbon, the first spherical crystalline carbon including secondary particles in which primary particles of crystalline carbon are assembled, the first spherical crystalline carbon having a coating of crystalline carbon, second spherical crystalline carbon, the second spherical crystalline carbon including secondary particles in which primary particles of crystalline carbon are assembled, the second spherical crystalline carbon having a coating of amorphous carbon, and flake-shaped graphite.

In the negative active material layer, the flake-shaped graphite may be disposed between the first spherical crystalline carbon and the second spherical crystalline carbon, and the first spherical crystalline carbon and the second spherical crystalline carbon may be in direct contact with the flake-shaped graphite.

An average particle diameter (D50) of the flake-shaped graphite may be about 1 µm to about 10 µm.

An average particle diameter (D50) of the flake-shaped graphite may be about 3 µm to about 7 µm.

An amount of the flake-shaped graphite in the negative active material may be about 1 wt % to about 10 wt % based on a total weight of the negative active material.

An amount of the first spherical crystalline carbon in the negative active material may be about 10 wt % to about 80 wt % based on a total weight of the negative active material.

An amount of the second spherical crystalline carbon in the negative active material may be about 10 wt % to about 80 wt % based on a total weight of the negative active material.

An amount of the negative active material in the negative active material layer may be about 97 wt % to about 99 wt % based on a total weight of the negative active material layer.

A loading level of the negative active material layer may be about 15 mg/cm$^2$ or more.

A loading lever of the negative active material layer may be about 15 mg/cm$^2$ to about 40 mg/cm$^2$.

Embodiments are also directed to a rechargeable lithium battery, including a negative electrode according to an embodiment, a positive electrode including a positive active material, and a non-aqueous electrolyte.

Embodiments are also directed to a negative electrode for a rechargeable lithium battery, including a current collector, and a negative active material on the current collector, the negative active material including flake-shaped graphite, first particles, the first particles being an assembly of primary particles of crystalline carbon particles, the first particles including a coating of crystalline carbon on the assembled primary particles, and second particles, the second particles being an assembly of crystalline carbon particles, the second particles including a coating of amorphous carbon on the assembled primary particles.

BRIEF DESCRIPTION OF THE DRAWINGS

Features will become apparent to those of skill in the art by describing in detail example embodiments with reference to the attached drawings in which.

DETAILED DESCRIPTION

Figure 1:
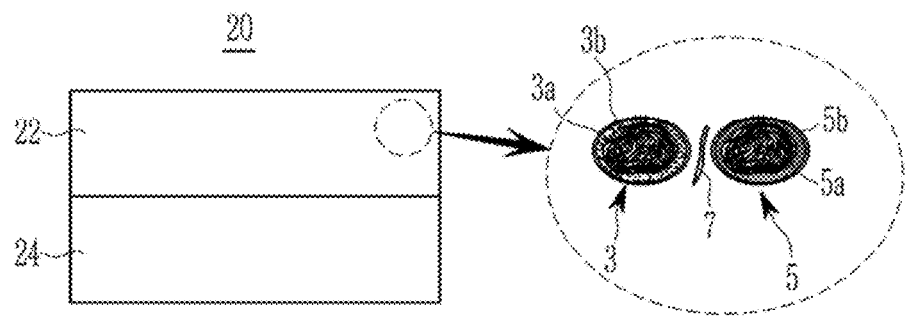
FIG. 1 illustrates a schematic view showing an existing state of a negative active material in a negative electrode according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

A negative electrode for a rechargeable lithium battery according to an example embodiment may include a negative active material layer including a negative active material, and a current collector supporting the negative active material layer.

The negative active material may include a first spherical crystalline carbon including secondary particles in which primary particles of crystalline carbon are assembled, a second spherical crystalline carbon including secondary particles in which primary particles of crystalline carbon are assembled, and flake-shaped graphite. The first spherical crystalline carbon may be coated with crystalline carbon, and the second spherical crystalline carbon may be coated with amorphous carbon.

FIG. 1 shows a negative electrode 20 for a rechargeable lithium battery according to an example embodiment. The negative electrode 20 includes a negative active material layer 22 and a current collector 24 supporting the negative active material layer 22.

In the example embodiment illustrated in FIG. 1, the negative active material layer 22 includes a first spherical crystalline carbon 3, a second spherical crystalline carbon 5, and flake-shaped graphite 7. Referring to the inset in FIG. 1, the enlarged view of the negative active material layer 22 shows that the flake-shaped graphite 7 may be disposed between the first spherical crystalline carbon 3 and the second spherical crystalline carbon 5. As shown in FIG. 1, the flake-shaped graphite 7 may be in a direct contact with the first spherical crystalline carbon 3 and the second spherical crystalline carbon 5.

The first spherical crystalline carbon 3 may include secondary particles in which primary particles 3a of crystalline carbon are assembled and coated with crystalline carbon 3b on the surface. The second spherical crystalline carbon 5 may include secondary particles in which primary particles 5a of crystalline carbon are assembled and coated with amorphous carbon 5b on the surface.

As shown in FIG. 1, the flake-shaped graphite 7 may be disposed between the first spherical crystalline carbon 3 and the second spherical crystalline carbon 5. For example, the flake-shaped graphite 7 may be in direct contact with the first spherical crystalline carbon 3 and the second spherical crystalline carbon 5, which may help maintain good contact during charge and discharge of a battery. The flake-shaped graphite 7 may be disposed between the first spherical crystalline carbon 3 and the second spherical crystalline carbon 5. The flake-shaped graphite 7 may help bind the first spherical crystalline carbon 3 and the second spherical crystalline carbon 5, may maintain good electrical contact between the first spherical crystalline carbon 3 and the second spherical crystalline carbon 5 through repeated expansion/shrinkage of an active material during charging and discharging cycles, and may help provide improved high-temperature storage characteristics and improved cycle-life characteristics.

An average particle diameter (D50) of the flake-shaped graphite may be about 1 μm to about 10 μm, for example, about 1 μm to about 9 μm, about 3 μm to about 7 μm, or about 3 μm to about 5 μm. The flake-shaped graphite has a sheet-shape, such that the average particle diameter means a length of a major axis (longer axis). In general, the average particle diameter is measured by a particle measuring device as D50. Thus, the average particle diameter of the graphite in the present specification means an average particle diameter (D50). As used herein, when a definition is not otherwise provided, an average particle diameter (D50) indicates a particle diameter where a cumulative volume is about 50 volume % in a particle distribution.

When the average particle diameter (D50) of the flake-shaped graphite is within the above range, the flake-shaped graphite may be well placed between the first spherical crystalline carbon and the second spherical crystalline carbon, and may effectively maintain contacts with the expansion and contraction during charging and discharging. If the average particle diameter (D50) of the flake-shaped graphite is less than about 1 μm, a side reaction with an electrolyte may occur to deteriorate high-temperature storage and cycle-life characteristics and to decrease high-rate capability due to increase of resistance. If the average particle diameter (D50) of the flake-shaped graphite is greater than about 10 μm, it may not be disposed between the first spherical crystalline carbon and the second spherical crystalline carbon and thus it may be difficult to contact them during charging and discharging. For example, it may contact the first spherical crystalline carbon and the second spherical crystalline carbon in a C-axis direction (basal plane) and thus may not contact them after discharging.

According to the present example embodiment, the first spherical crystalline carbon includes secondary particles in which primary particles of crystalline carbon are assembled. An average particle diameter (D50) of the secondary particles may be about 10 μm to about 30 μm, for example, about 10 μm to about 20 μm. An average particle diameter (D50) of the primary particles may be about 1 μm to about 20 μm, for example, about 1 μm to about 10 μm.

When the average particle diameter (D50) of the secondary particles of the first spherical crystalline carbon is within the above ranges, a spherical shape may be formed more effectively without side reactions, and cycle-life characteristic and high-temperature storage characteristics may be improved and high-rate capability may also be improved.

When the average particle diameter (D50) of the primary particles is within the above ranges, good sphericity and stable performance may be realized.

A specific surface area of the first spherical crystalline carbon may be about 1 $m^2$/g to about 5 $m^2$/g, for example, about 2.5 $m^2$/g to about 3 $m^2$/g. When the specific surface area of the first spherical crystalline carbon is within the above ranges, improved high-rate capability may be obtained, and high-temperature cycle-life characteristics may be improved, for example, by suppression of side reactions.

According to the present example embodiment, the second spherical crystalline carbon includes secondary particles in which primary particles of crystalline carbon are assembled. An average particle diameter (D50) of the secondary particles may be about 10 μm to about 30 μm, for example, about 10 μm to about 20 μm. An average particle diameter (D50) of the primary particles may be about 1 μm to about 20 μm, for example, about 1 μm to about 10 μm.

When the average particle diameter (D50) of the secondary particles of the second spherical crystalline carbon is within the above ranges, a spherical shape may be formed more effectively without side reactions, and cycle-life characteristic and high-temperature storage characteristics may be improved and high-rate capability may also be improved.

When the average particle diameter (D50) of the primary particles is within the above ranges, good sphericity and stable performance may be realized.

In an example embodiment, a specific surface area of the second spherical crystalline carbon may be about 1 $m^2$/g to about 5 $m^2$/g, for example, about 2.5 $m^2$/g to about 3 $m^2$/g.

When the specific surface area of the second spherical crystalline carbon is within the above ranges, improved high-rate capability may be obtained, and high-temperature cycle-life characteristics may be improved, for example, by suppressing side reactions.

In an example embodiment, the crystalline carbon may be natural graphite, artificial graphite, or a combination thereof.

The first spherical crystalline carbon may be coated with crystalline carbon on the surface. The second spherical crystalline carbon may be coated with amorphous carbon on the surface. The flake-shaped graphite may not be coated with either the crystalline carbon or the amorphous carbon on the surface. Thus, the first spherical crystalline carbon may include a secondary particle core and a crystalline carbon coating layer, the second spherical crystalline carbon may include a secondary particle core and an amorphous carbon coating layer, and the flake-shaped graphite may not include a coating layer.

In the crystalline carbon coating layer, the crystalline carbon may be artificial graphite, natural graphite, or a combination thereof.

In the amorphous carbon coating layer, the amorphous carbon may be obtained by heat-treating an amorphous carbon precursor and may be soft carbon, hard carbon, a mesophase pitch carbonized product, petroleum coke, or coal coke. The amorphous carbon precursor may be citric acid, stearic acid, sucrose, polyvinylidene fluoride, carboxymethyl cellulose (CMC), hydroxypropyl cellulose, regenerated cellulose, polyvinylpyrrolidone, tetrafluoroethylene, polyethylene, polypropylene, an ethylene-propylene-diene monomer (EPDM), a sulfonated ethylene-propylene-diene monomer (SEPDM), starch, a phenolic resin, a furan resin, furfuryl alcohol, polyacrylic acid, polyacrylsodium, polyacrylonitrile, polyimide, an epoxy resin, a cellulose, styrene, polyvinyl alcohol, polyvinyl chloride, a coal-based pitch, a petroleum-based pitch, mesophase pitch, low molecular weight heavy oil, glucose, gelatin, a saccharide, or a combination thereof.

A thickness of the crystalline carbon coating layer may be about 0.1 nm to about 100 nm. When the thickness of the crystalline carbon coating layer is within the above range, side reactions with an electrolyte may be suppressed, and the cycle-life characteristics may be improved.

A thickness of the amorphous carbon coating layer may be about 0.1 nm to about 100 nm. When the thickness of the amorphous carbon coating layer is within the above range, side reactions with an electrolyte may be suppressed, impregnation and surface characteristics may be improved, and a long cycle-life and high power characteristics may be provided.

According to an example embodiment, the coating layer of the first spherical crystalline carbon is crystalline and the coating layer of the second spherical crystalline carbon is amorphous, and long cycle-life and high power characteristics may both be provided. If the first spherical crystalline carbon or the second spherical crystalline carbon do not include the coating layer, side reactions with the electrolyte may occur, and cycle-life characteristics and charge and discharge efficiency may be decreased. In addition, if both of the first spherical crystalline carbon and the second spherical crystalline carbon include crystalline carbon coating layers, electrolyte impregnation and polarization phenomena may be increased and power characteristics may be deteriorated.

The flake-shaped graphite without a coating layer may help suppress side reactions. If the flake-shaped graphite has an amorphous carbon coating layer, side reactions with the electrolyte may occur at a high temperature and thus deteriorate high-temperature storage and cycle-life performance. If the flake-shaped graphite has a crystalline carbon coating layer, low temperature and high-rate charge and discharge characteristics may be deteriorated due to an alignment problem.

According to an example embodiment, flake-shaped graphite having no coating layer and having an average particle diameter (D50) of about 1 μm to about 10 μm is used along with the first spherical crystalline carbon having the crystalline carbon coating layer and the second spherical crystalline carbon having the amorphous carbon coating layer as a negative active material. The flake-shaped graphite may be disposed between the first spherical crystalline carbon and the second spherical crystalline carbon, may help to maintain an electrical contact despite repetitive charges and discharges, may help to reduce the side reactions with the electrolyte, and may help to improve high-temperature storage characteristics and cycle-life characteristics.

The flake-shaped graphite may be included in an amount of about 1 wt % to about 10 wt % based on 100 wt % of a total amount of the negative active material. When the flake-shaped graphite is included within the range, a binding force between the first spherical crystalline carbon and the second spherical crystalline carbon may be improved, the high temperature cycle-life characteristics and the high-temperature storage characteristics may be improved, and power characteristics may be improved. If the flake-shaped graphite is included in an amount of less than about 1 wt %, the effect from flake-shaped graphite may be little. If the flake-shaped graphite is included in an amount of greater than about 10 wt %, the flake-shaped graphite may have a relatively large specific surface area and thus may deteriorate a binding force between the first spherical crystalline carbon and the second spherical crystalline carbon, cause an agglomeration, and deteriorate high temperature cycle-life characteristics and high-temperature storage characteristics due to the side reactions, and may also increase surface alignment of a negative electrode and thus may deteriorate power characteristics.

The first spherical crystalline carbon may be included in an amount of about 10 wt % to about 80 wt % based on 100 wt % of a total amount of the negative active material. The second spherical crystalline carbon may be included in an amount of about 10 wt % to about 80 wt % based on 100 wt % of a total amount of the negative active material.

When first spherical crystalline carbon coated with the crystalline carbon is included within the range, a long cycle-life, for example, room temperature and high temperature cycle-life characteristics may be improve, and high-temperature storage characteristics may be improved. When second spherical crystalline carbon coated with the amorphous carbon is included within the range, power characteristics may be improved.

The first spherical crystalline carbon and the second spherical crystalline carbon may be mixed in a weight ratio of about 1:9 to about 9:1. When the first spherical crystalline carbon and the second spherical crystalline carbon are mixed within the mixing ratio range, a battery simultaneously effectively satisfying high-rate charge and discharge characteristics and long cycle-life characteristics and having desired properties may be obtained.

The crystalline carbon coating layer of the first spherical crystalline carbon may be formed by mixing a soft carbon precursor, amorphous carbon, or semi-crystalline carbon, and a secondary particle, and then heat-treating the mixture at about 2400° C. or more (for example, about 2400° C. to about 3000° C.) to convert the soft carbon precursor, the amorphous carbon, or the semi-crystalline carbon into crystalline carbon and thus form the crystalline carbon coating layer. The soft carbon precursor may be petroleum pitch, coal pitch, green coke, or a combination thereof. The amorphous carbon or semi-crystalline carbon may be petroleum-based coke, coal-based coke, or a combination thereof.

The amorphous carbon coating layer of the second spherical crystalline carbon may be formed by mixing an amorphous carbon precursor and a secondary particle, and then heat-treating the mixture at less than or equal to about 2000° C. (for example, about 700° C. to about 2000° C.) to convert the precursor into amorphous carbon and thus form the amorphous carbon coating layer. The amorphous carbon precursor may use the aforementioned amorphous carbon precursor. The formation of the amorphous carbon coating layer may be performed under an inert atmosphere such as Ar, $N_2$, and the like.

An amount of the negative active material may be about 96 wt % to about 99 wt % based on a total amount, 100 wt %, of the negative active material layer. When the amount of the negative active material is within the range, a high energy density battery may be realized.

A loading level of the negative active material layer may be greater than or equal to about 15 mg/cm². For example, the negative active material layer may have the loading level of about 15 mg/cm² to about 40 mg/cm².

When the loading level of the negative active material layer is within the range, a high energy density battery may be realized.

The negative active material layer may include one or more of a binder or a conductive material. An amount of the binder in the negative active material layer may be about 1 wt % to about 4 wt % based on a total weight of the negative active material layer. In an example embodiment, in the negative active material layer, about 96 wt % to about 99 wt % of the negative active material, about 0.5 wt % to about 2 wt % of the binder, and about 0.5 wt % to about 2 wt % of the conductive material may be used.

The binder may improve binding properties of negative active material particles with one another and with a current collector. The binder may include a non-aqueous binder, an aqueous binder, or a combination thereof.

The non-aqueous binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may include be a styrene-butadiene rubber, an acrylated styrene-butadiene rubber (SBR), an acrylonitrile-butadiene rubber, an acrylic rubber, a butyl rubber, a fluorine rubber, an ethylenepropylene copolymer, polyepichlorohydrine, polyphosphazene, polyacrylonitrile, polystyrene, ethylenepropylenediene copolymer, polyvinylpyridine, chlorosulfonated polyethylene, a latex, a polyester resin, an acrylic resin, a phenolic resin, an epoxy resin, polyvinyl alcohol, or a combination thereof.

When the aqueous binder is used as the negative electrode binder, a cellulose-based compound may be further used to provide viscosity as a thickener. The cellulose-based compound may include one or more of carboxymethyl cellulose, hydroxypropylmethyl cellulose, methyl cellulose, or alkali metal salts thereof. The alkali metal may be Na, K, or Li. The thickener may be included in an amount of about 0.1 parts by weight to about 3 parts by weight based on 100 parts by weight of the negative active material.

The conductive material may be included to enhance electrode conductivity. A suitable electrically conductive material may be used as a conductive material. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include a copper foil, a nickel foil, a stainless steel foil, a titanium foil, a nickel foam, a copper foam, a polymer substrate coated with a conductive metal, a combination thereof, etc.

The negative electrode may be formed by mixing the negative active material, the binder, and the conductive material in a solvent to prepare a negative active material composition, and coating the composition on a current collector followed by drying and compressing the same. The solvent may include water such as distilled water, or an organic solvent such as N-methyl pyrrolidone.

Another embodiment provides a rechargeable lithium battery including the negative electrode, a positive electrode, and an electrolyte.

The positive electrode may include a current collector and a positive active material layer formed on the current collector and including a positive active material.

The positive active material may be or include a compound (lithiated intercalation compound) being capable of intercalating and deintercalating lithium, and specifically one or more composite oxides of a metal selected from cobalt, manganese, nickel, and a combination thereof, and lithium. More specific examples may be compounds represented by one of the following chemical formulae: $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $Li_aFePO_4$ ($0.90 \le a \le 1.8$).

In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like.

In the positive electrode, a content of the positive active material may be about 90 wt % to about 98 wt % based on the total weight of the positive active material layer.

In an example embodiment, the positive active material layer may include one or more of a binder or a conductive material. The amount of the binder and the conductive material may be about 1 wt % to about 5 wt % based on the total weight of the positive active material layer.

The binder may improve binding properties of positive active material particles with one another and with a current collector, and examples thereof may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may be included to provide electrode conductivity. A suitable electrically conductive material may be used as a conductive material. Examples of the conductive material may include a carbon-based material such as natural graphite, artificial graphite, carbon black, acetylene black, ketjen black, carbon fiber and the like; a metal-based material of a metal powder or a metal fiber including copper, nickel, aluminum, silver, and the like; a conductive polymer such as a polyphenylene derivative; or a mixture thereof.

The current collector may include an aluminum foil, a nickel foil, or a combination thereof.

The positive electrode may be formed by mixing a positive active material, a binder, and a conductive material in a solvent to prepare a positive active material composition, and coating the composition on a current collector followed by drying and compressing the same. The solvent may include an organic solvent such as N-methyl pyrrolidone.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. The ketone-based solvent may include cyclohexanone and the like. The alcohol-based solvent may include ethyl alcohol, isopropyl alcohol, and the like, and examples of the aprotic solvent may include nitriles such as R—CN (where R is a C2 to C20 linear, branched, or cyclic hydrocarbon, or may include a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desirable battery performance.

When the non-aqueous organic solvent is used in a mixture, it may be a mixed solvent of cyclic carbonate and chain carbonate; a mixed solvent of cyclic carbonate and a propionate based solvent; or a mixed solvent of cyclic carbonate, chain carbonate, and a propionate based solvent. The propionate based solvent may be methyl propionate, ethyl propionate, propyl propionate, or a combination thereof.

Herein, when the cyclic carbonate and the chain carbonate or the cyclic carbonate and the propionate based solvent are mixed, they may be mixed in a volume ratio of about 1:1 to about 1:9, which may improve performance of an electrolyte solution. In addition, when the cyclic carbonate, the chain carbonate, and the propionate based solvent are mixed, they may be mixed in a volume ratio of about 1:1:1 to about 3:3:4. The mixing ratios of the solvents may be appropriately adjusted according to desirable properties.

The organic solvent may further include an aromatic hydrocarbon-based organic solvent in addition to the carbonate-based solvent. The carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 1.

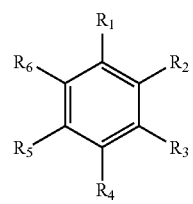

[Chemical Formula 1]

In Chemical Formula 1, $R_1$ to $R_6$ may be the same or different and may be selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3- diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate or an ethylene carbonate-based compound of Chemical Formula 2, which may improve a cycle-life of a battery.

[Chemical Formula 2]

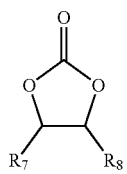

In Chemical Formula 2, $R_7$ and $R_8$ may be the same or different and may be selected from hydrogen, a halogen, a cyano group (CN), a nitro group ($NO_2$), and a fluorinated C1 to C5 alkyl group. At least one of $R_7$ and $R_8$ may be selected from a halogen, a cyano group (CN), a nitro group ($NO_2$), and a fluorinated C1 to C5 alkyl group. $R_7$ and $R_8$ may not simultaneously be hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving a cycle-life may be used within an appropriate range.

The lithium salt may be dissolved in an organic solvent to supply the battery with lithium ions, basically operate the rechargeable lithium battery, and improve transportation of the lithium ions between positive and negative electrodes. Examples of the lithium salt include at least one supporting salt selected from $LiPF_6$, $LiBF_4$, $LiSbF_6$, $LiAsF_6$, LiN($SO_2C_2F_5$)$_2$, Li($CF_3SO_2$)$_2$N, LiN ($SO_3C_2F_5$)$_2$, $LiC_4F_9SO_3$, $LiClO_4$, $LiAlO_2$, $LiAlCl_4$, LiN($C_xF_{2x+1}SO_2$)($C_yF_{2y+1}SO_2$), wherein, x and y are natural numbers, for example an integer ranging from 1 to 20), LiCl, LiI, and LiB($C_2O_4$)$_2$ (lithium bis(oxalato)borate: LiBOB). A concentration of the lithium salt may range from about 0.1 M to about 2.0 M. When the lithium salt is included at the above concentration range, an electrolyte may have excellent performance and lithium ion mobility due to good electrolyte conductivity and viscosity.

The rechargeable lithium battery may further include a separator between the negative electrode and the positive electrode. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
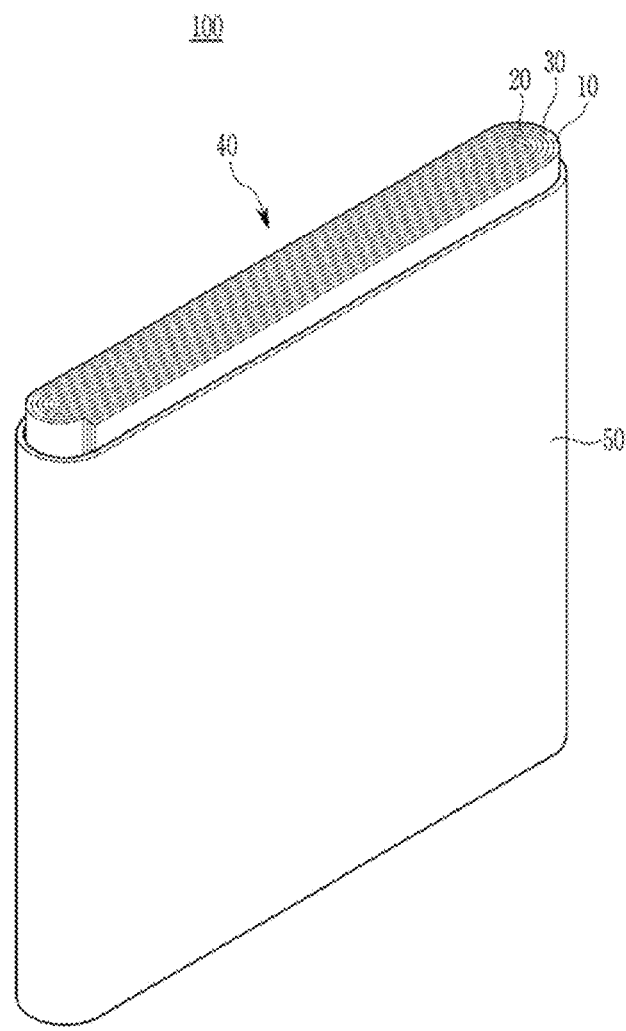
FIG. 2 illustrates a schematic view showing a structure of a rechargeable lithium battery according to an example embodiment.

FIG. 2 is an exploded perspective view of a rechargeable lithium battery according to one embodiment. The rechargeable lithium battery according to an example embodiment is illustrated as a prismatic battery but may include variously-shaped batteries such as a cylindrical battery, a pouch battery, and the like.

Referring to FIG. 2, a rechargeable lithium battery 100 according to an example embodiment includes an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30.

The following Examples, Reference Example, and Comparative Examples are provided in order to highlight characteristics of one or more embodiments, but it will be understood that the Examples, Reference Example, and Comparative Examples are not to be construed as limiting the scope of the embodiments, nor are the Reference Example or Comparative Examples to be construed as being outside the scope of the embodiments. Further, it will be understood that the embodiments are not limited to the particular details described in the Examples, Reference Example, and Comparative Examples.

Example 1

A negative active material was prepared by mixing 60 parts by weight of a first spherical natural graphite particle having an artificial graphite coating layer, 35 parts by weight of a second spherical natural graphite particle having a soft carbon amorphous carbon coating layer, and 5 parts by weight of flake-shaped graphite having an average particle diameter (D50) of 5 μm.

The first spherical natural graphite particle had an average particle diameter (D50) of 11 μm and a specific surface area of 2.9 m$^2$/g, in which primary natural graphite particles having an average particle diameter (D50) of 5 μm were assembled. The crystalline carbon (artificial graphite) coating layer had a thickness of 10 nm.

The second spherical natural graphite particle was a secondary particle having an average particle diameter (D50) of 11 μm and a specific surface area of 2.7 m$^2$/g, in which primary natural graphite particles having an average particle diameter (D50) of 5 μm were assembled. The amorphous carbon (soft carbon) coating layer had a thickness of 10 nm.

The negative active material, carboxymethyl cellulose (CMC), and styrene-butadiene rubber (SBR) (weight ratio of 98:0.8:1.2) were mixed in a distilled water solvent to prepare negative active material slurry. The negative active material slurry was coated on a Cu foil current collector, and then dried and compressed to manufacture a negative electrode having a loading level of 19 mg/cm$^2$.

Example 2

A negative electrode was manufactured according to the same method as Example 1 except that 5 parts by weight of flake-shaped graphite having an average particle diameter of 3 μm was used instead of 5 parts by weight of the flake-shaped graphite having an average particle diameter of 5 μm.

Reference Example 1

A negative electrode was manufactured according to the same method as Example 1 except that 30 parts by weight of a second spherical natural graphite particle, 60 parts by weight of a first spherical natural graphite particle, and 10 parts by weight of flake-shaped graphite having an average particle diameter of 11 μm were mixed instead of 35 parts by weight of the second spherical natural graphite particle, 60 parts by weight of the first spherical natural graphite particle, and 5 parts by weight of the flake-shaped graphite having an average particle diameter of 5 μm.

Comparative Example 1

A negative active material was prepared by mixing 30 parts by weight of a second spherical natural graphite particle having a soft carbon amorphous carbon coating layer and 70 parts by weight of a first spherical natural graphite particle having an artificial graphite coating layer.

The second spherical natural graphite particle was a secondary particle having an average particle diameter (D50) of 11 μm and a specific surface area of 2.7 m$^2$/g, in which primary natural graphite particles having an average particle diameter (D50) of 5 μm were assembled, and the first spherical natural graphite particle had an average particle diameter (D50) of 11 μm and a specific surface area of 2.9 m$^2$/g in which primary natural graphite particles having an average particle diameter (D50) of 5 μm were assembled. In addition, the amorphous carbon coating layer had a thickness of 10 nm, and the crystalline carbon coating layer had a thickness of 10 nm.

The negative electrode, a lithium metal counter electrode, and an electrolyte were used to manufacture a half-cell having 1 C capacity of 3600 mAh. The electrolyte was prepared by dissolving 1.0 M LiPF$_6$ in ethylene carbonate and diethyl carbonate (a volume ratio of 50:50).

Comparative Example 2

A negative electrode was manufactured according to the same method as Example 1 except that the negative active material was prepared using flake-shaped graphite having an average particle diameter of 5 μm and having a 10 nm-thick amorphous carbon coating layer on the surface thereof.

Comparative Example 3

A negative electrode was manufactured according to the same method as Example 1 except that the negative active material was prepared using 95 parts by weight of a spherical natural graphite particle having a soft carbon amorphous carbon coating layer and 5 parts by weight of flake-shaped graphite having an average particle diameter (D50) of 5 μm.

Here, the spherical natural graphite particle was a secondary particle having an average particle diameter (D50) of 11 μm and a specific surface area of 2.7 m$^2$/g in which primary natural graphite particles having an average particle diameter (D50) of 5 μm were assembled, and the amorphous carbon coating layer had a thickness of 10 nm.

Comparative Example 4

A negative electrode was manufactured according to the same method as Example 1 except that the negative active material was prepared using 95 parts by weight of a spherical natural graphite particle having an artificial graphite coating layer and 5 parts by weight of flake-shaped graphite having an average particle diameter (D50) of 5 μm.

Here, the spherical natural graphite particle was a secondary particle having an average particle diameter (D50) of 11 μm and a specific surface area of 2.7 m$^2$/g in which primary natural graphite particles having an average particle diameter (D50) of 5 μm were assembled, and the amorphous carbon coating layer had a thickness of 10 nm.

SEM Images

SEM images of the surfaces of the negative electrodes according to Example 1, Comparative Example 1, and Reference Example 1 are respectively shown in FIGS. 3A, 3B, 4A, 4B, 5A, and 5B.

Figure 3A:
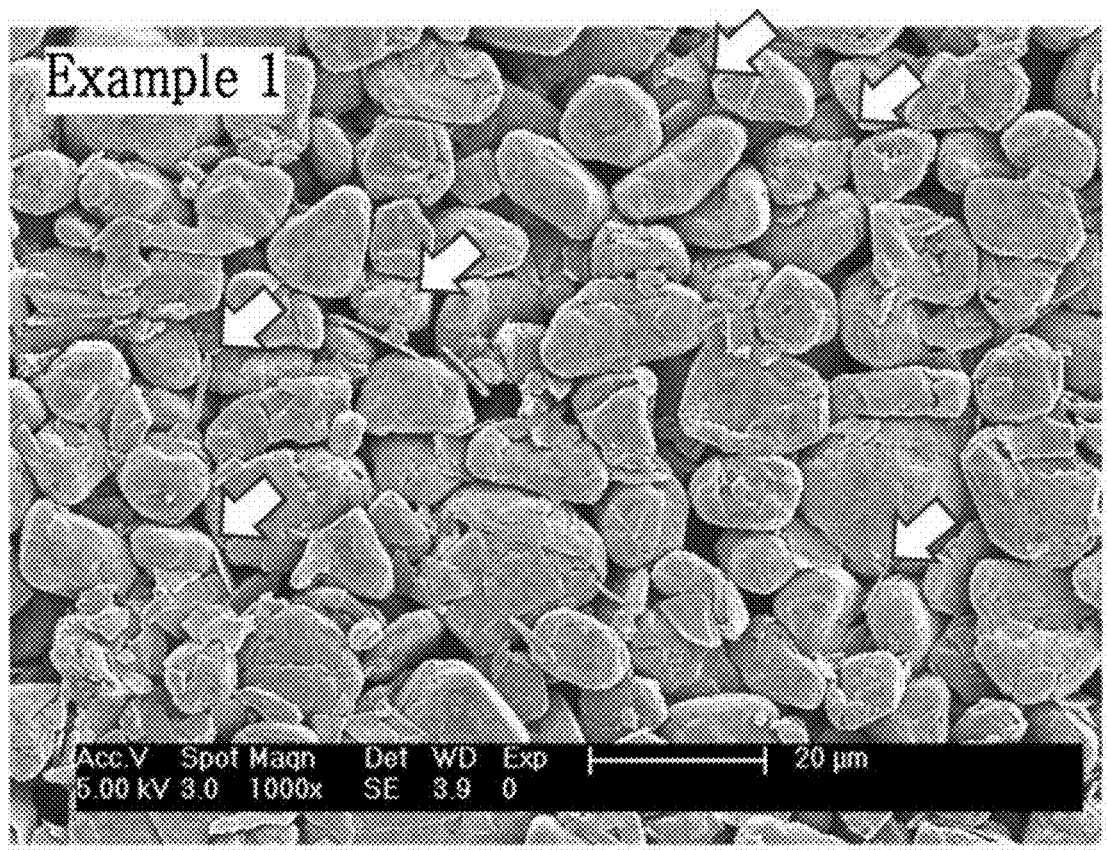
FIGS. 3A and 3B illustrate SEM images of the surface of the negative electrode manufactured according to Example 1.
Figure 3B:
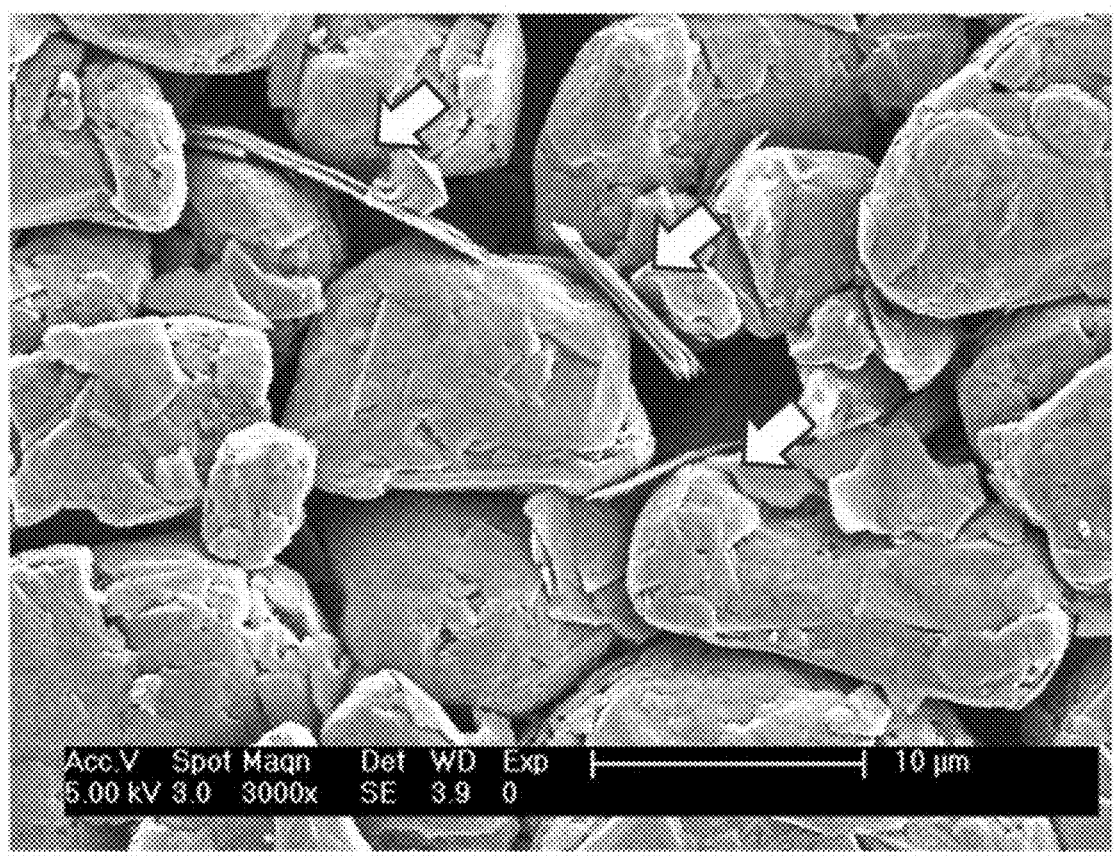

As shown in FIG. 3A (1000 times magnified) and in FIG. 3B (3000 times magnified), as for the negative electrode according to Example 1, the flake-shaped graphite (marked as an arrow) was disposed between the first spherical natural graphite particles and the second spherical natural graphite particles and thus bound the first spherical natural graphite particles and the second spherical natural graphite particles.

Figure 4A:
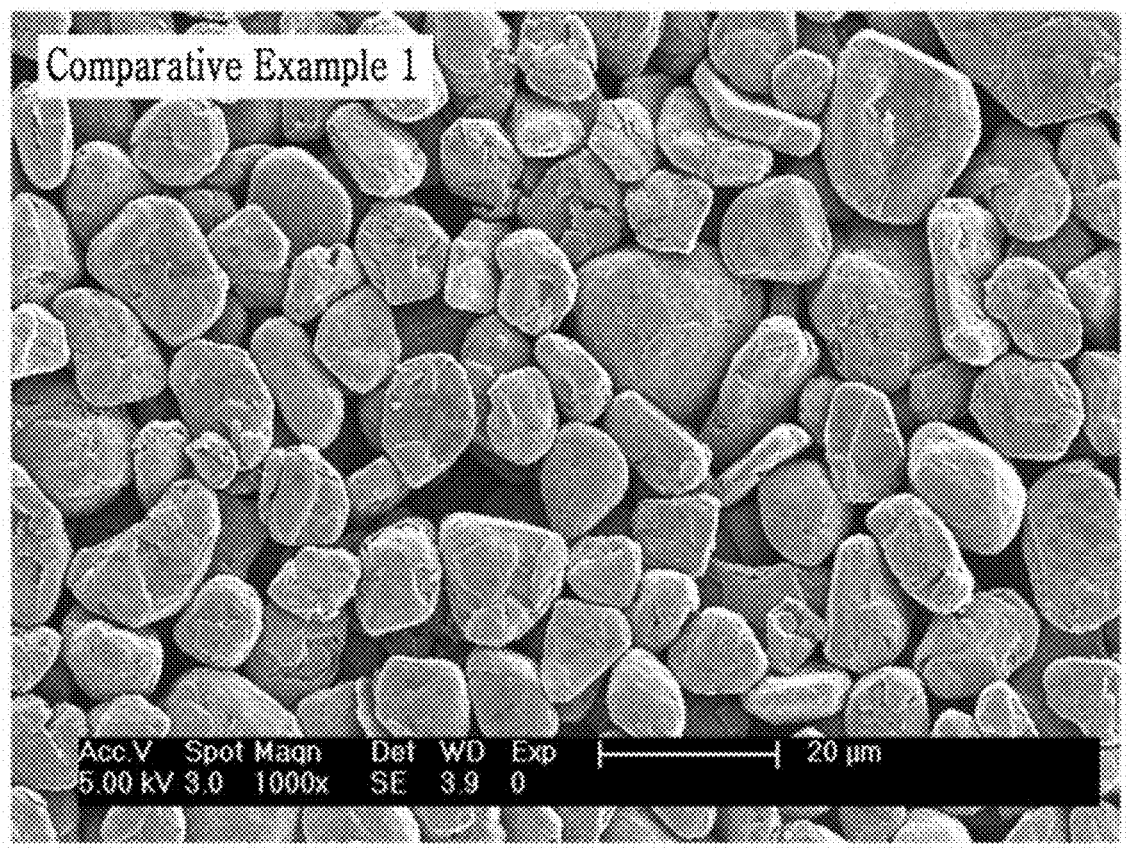
FIGS. 4A and 4B illustrate SEM images of the surface of the negative electrode manufactured according to Comparative Example 1.
Figure 4B:
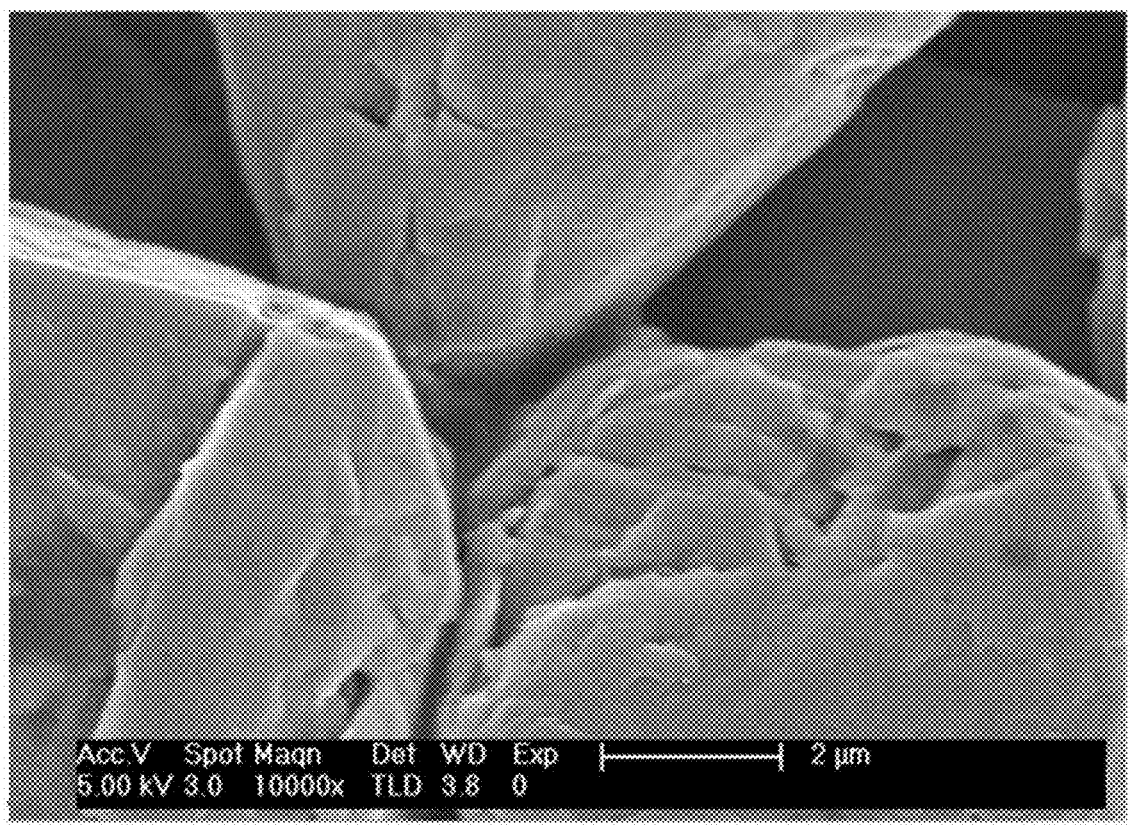
Figure 5A:
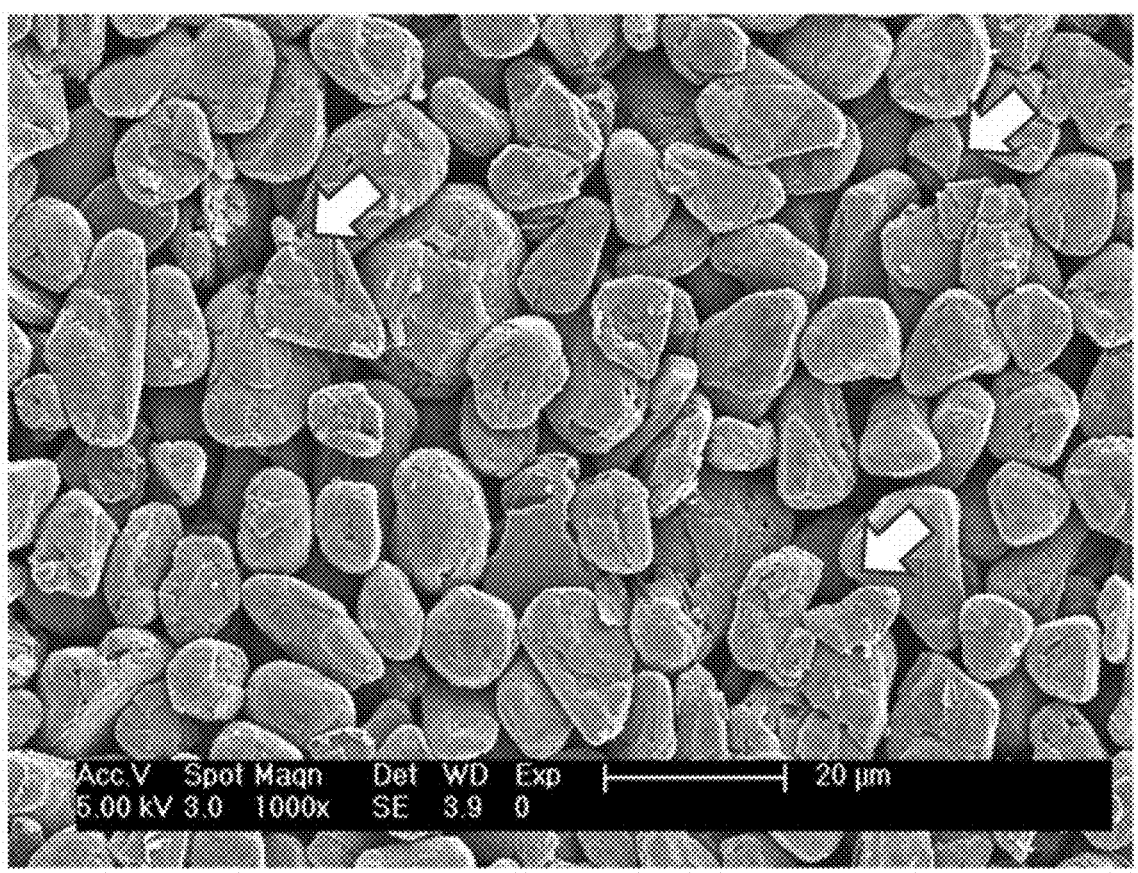
FIGS. 5A and 5B illustrate SEM images of the surface of the negative electrode manufactured according to Reference Example 1.
Figure 5B:
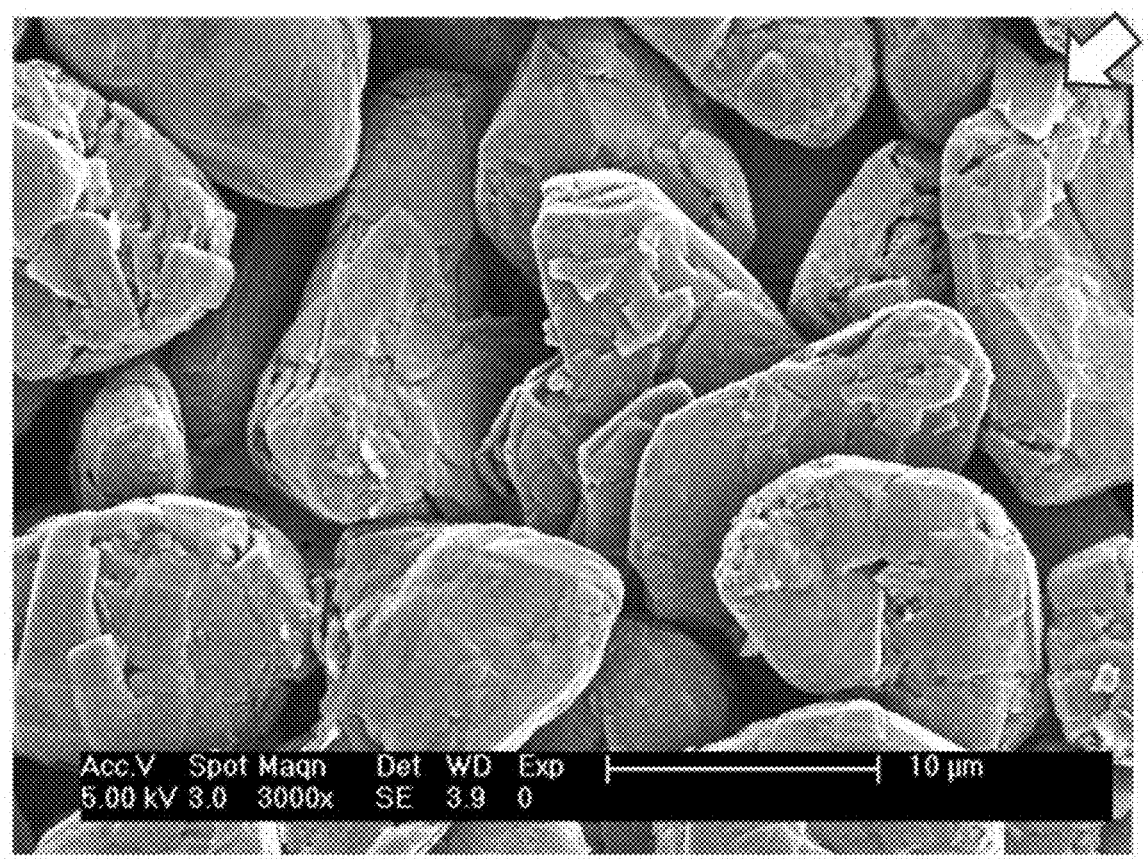

As shown in FIG. 4A (1000 times magnified) and in FIG. 4B (3000 times magnified), as for the negative electrode according to Comparative Example 1, only a binder was disposed between the first spherical natural graphite particles and the second spherical natural graphite particles. In addition, as shown in FIG. 5A (1000 times magnified) and in FIG. 5B (3000 times magnified), when flake-shaped graphite having an average particle diameter (D50) of 11 μm was used, the flake-shaped graphite was not disposed between the first spherical natural graphite particles and the second spherical natural graphite particles, but was separately present, unlike FIGS. 3A and 3B.

Manufacture of Rechargeable Lithium Battery Cell

Each negative electrode according to Examples 1 and 2, Reference Example 1, and Comparative Examples 1 to 4, a positive electrode, and an electrolyte were used to manufacture 18650 type lithium secondary full battery cells having capacity of about 400 mAh.

The positive electrode was manufactured by mixing LiNi$_{0.6}$Co$_{0.2}$Mn$_{0.2}$O$_2$, a ketjen black conductive material, and polyvinylidene fluoride in a weight ratio of 96:2:2 in an N-methyl pyrrolidone solvent to prepare positive active material slurry, coating the positive active material slurry on an Al foil current collector, and then, drying and compressing it.

The electrolyte was prepared by dissolving 1.0 M LiPF$_6$ in a mixed solvent of ethylene carbonate and diethyl carbonate (a volume ratio of 50:50).

Evaluation of Cycle-life Characteristics at Low Temperature (−10° C.), Room Temperature (25° C.), and High Temperature (45° C.)

Low temperature: the rechargeable lithium battery cells were constant current/constant voltage charged at 0.5 C, and constant current discharged at 0.5 C condition at −10° C. The charging and discharging were 100 times repeated and a ratio of the 100$^{th}$ charge capacity relative to the 1$^{st}$ charge capacity is shown as a low-temperature capacity retention in Table 1.

Room temperature: the rechargeable lithium battery cells were constant current/constant voltage charged at 1 C and constant current discharged at 1 C at 25° C. The charging and discharging were 100 times repeated and a ratio of the 100$^{th}$ charge capacity relative to the 1$^{st}$ charge capacity is shown as a room-temperature capacity retention in Table 1.

High temperature: the rechargeable lithium battery cells were constant current/constant voltage charged at 1 C and constant current discharged at 1 C at 45° C. The charging and discharging were 100 times repeated and a ratio of the 100$^{th}$ charge capacity relative to the 1$^{st}$ charge capacity is shown as a high-temperature capacity retention in Table 1.

TABLE 1

| | Capacity retention (%) at low temperature (−10° C.) | Capacity retention (%) at room temperature (25° C.) | Capacity retention (%) at high temperature (45° C.) |
|---|---|---|---|
| Example 1 | 85 | 86 | 84 |
| Example 2 | 87 | 84 | 81 |
| Comparative Example 1 | 70 | 10 | 10 |
| Reference Example 1 | 68 | 13 | 20 |
| Comparative Example 2 | 80 | 71 | 41 |
| Comparative Example 3 | 87 | 80 | 62 |
| Comparative Example 4 | 35 | 82 | 81 |

As shown in Table 1, the rechargeable lithium battery cells according to Examples 1 and 2 (using the negative active materials including the first spherical natural graphite particle having the crystalline carbon coating layer, the second spherical natural graphite particle having the amorphous carbon coating layer, and the flake-shaped graphite having an average particle diameter (D50) of 1 µm to 10 µm) all showed greater than or equal to 81% capacity retention at all of the tested low temperature, room temperature, and high temperature conditions.

In comparison to Examples 1 and 2, Reference Example 1 (in which the negative active material included flake-shaped graphite having a large average particle diameter (D50) of 11 µm) showed deteriorated capacity retention at a low temperature, and significantly deteriorated capacity retentions at room temperature and high temperature, even though Reference Example 1 included flake-shaped graphite.

In comparison to Examples 1 and 2, Comparative Example 1 (using a negative active material including no flake-shaped graphite) showed deteriorated capacity retention at a low temperature, and significantly deteriorated capacity retentions at room temperature and high temperature.

In comparison to Examples 1 and 2, Comparative Example 2 (in which the negative active material included flake-shaped graphite having an amorphous carbon coating layer) showed deteriorated capacity retention at room temperature and significantly deteriorated capacity retention at high temperature, even though flake-shaped graphite was included.

In comparison to Examples 1 and 2, Comparative Example 3 (using only a negative active material including a spherical natural graphite particle having an amorphous carbon coating layer and flake-shaped graphite) showed deteriorated capacity retention at high temperature.

In comparison to Examples 1 and 2, Comparative Example 4 (using only a negative active material including a spherical natural graphite particle having a crystalline carbon coating layer and flake-shaped graphite) showed significantly deteriorated capacity retention at low temperature.

Storage Characteristics at High Temperature (60° C.)

The rechargeable lithium battery cells were charged at a 0.2 C-rate up to charge capacity of 100% (a SOC (State of Charge) of 100%, i.e., a full charge state, in which a battery cell was charged to have 100% of entire charge capacity during the charge and discharge at 4.5 V) and then stored at 60° C. for 30 days. A capacity ratio of charge capacity after the storage at 60° for 30 days relative to charge capacity before the storage was calculated, and the results are shown as a capacity retention in Table 2.

In addition, the rechargeable lithium battery cells were charged up to SOC100 at 0.2 C-rate and stored at 60° C. for 30 days and then, set at SOC50 (a charge state in which the battery cells were charged up to charge capacity of 50% based on 100% of the entire charge capacity during the charge and discharge at 4.5 V), and then direct current internal resistance (DC-IR) based on a voltage variation ratio relative to a current variation ratio was measured by measuring voltage drops (V) of the rechargeable lithium battery cells that occurred while a current was respectively supplied at a 1 C-rate and a 3 C-rate for 10 seconds. The results are shown as a DC-IR variation ratio in Table 2.

TABLE 2

| | Capacity retention (%) | DC-IR variation ratio (%) |
|---|---|---|
| Example 1 | 91 | 119 |
| Example 2 | 89 | 121 |
| Comparative Example 1 | 87 | 130 |
| Reference Example 1 | 85 | 134 |
| Comparative Example 2 | 72 | 155 |
| Comparative Example 3 | 61 | 161 |
| Comparative Example 4 | 90 | 115 |

As shown in Table 2, the rechargeable lithium battery cells according to Examples 1 and 2 (using a negative active material including the first spherical natural graphite particle having the crystalline carbon coating layer, the second spherical natural graphite particle having the amorphous carbon coating layer, and the flake-shaped graphite having an average particle diameter (D50) of 1 µm to 10 µm) showed a high capacity retention at a high temperature and a small DC-IR variation ratio.

In comparison to Examples 1 and 2, Reference Example 1 (in which the negative active material included flake-shaped graphite having a large average particle diameter (D50) of 11 µm) showed a lower capacity retention at high temperature and a high DC-IR variation ratio, even though flake-shaped graphite was included.

In comparison to Examples 1 and 2, Comparative Example 1 (using a negative active material including no flake-shaped graphite) showed a lowered capacity retention at high temperature and a high DC-IR variation ratio.

In comparison to Examples 1 and 2, Comparative Example 2 (in which the negative active material included the flake-shaped graphite having the amorphous carbon coating layer) showed a low capacity retention and a very high DC-IR variation ratio, even though flake-shaped graphite was included.

In comparison to Examples 1 and 2, Comparative Example 3 (using only the negative active material including the spherical natural graphite particle having the amorphous carbon coating layer and the flake-shaped graphite) showed a significantly deteriorated capacity retention at high temperature.

In comparison to Examples 1 and 2, Comparative Example 4 (using only the negative active material including the spherical natural graphite particle having the crystalline carbon coating layer and the flake-shaped graphite) showed a high capacity retention but a low DC-IR variation ratio. However, as discussed above in connection with Table 1, Comparative Example 4 showed a significantly lowered capacity retention at low temperature.

Battery Cell Decomposition Analysis after Discharge

The rechargeable lithium battery cells manufactured respectively using the negative electrodes according to Example 1 and Comparative Example 1 were charged and discharged 500 times at 1 C and completely discharged at 0.2 C, and then disassembled and photographed. An image of the negative electrode according to Example 1 is shown in FIG. 6, and an image of the negative electrode according to Comparative Example 1 is shown in FIG. 7.

Figure 6:
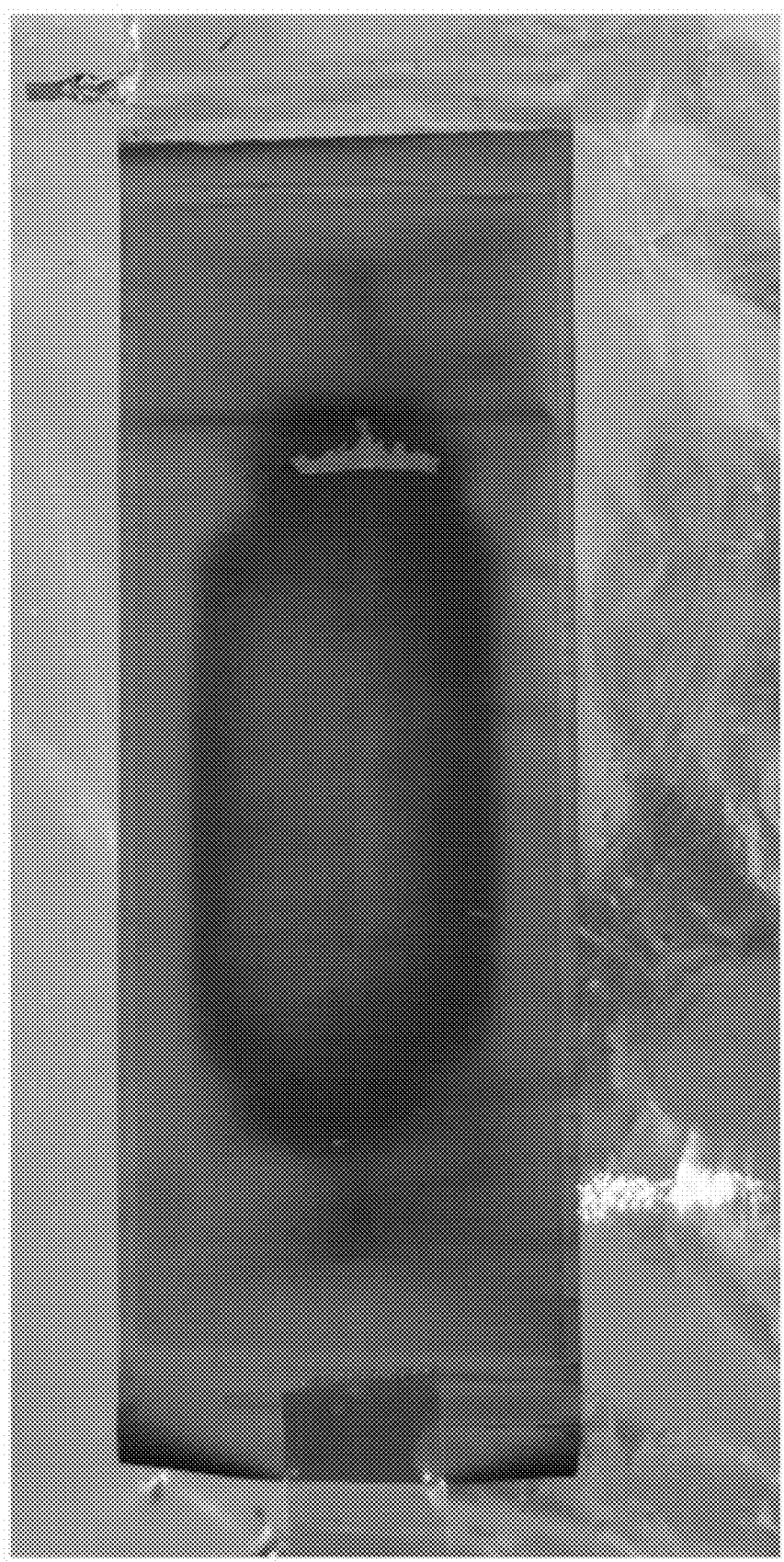
FIG. 6 illustrates an image of the surface of the negative electrode obtained after disassembling the battery according to Example 1 after charging and discharging.

As shown in FIG. 6, the negative electrode of Example 1 looked black, indicating a discharge state wherein lithium charged in the graphitic layer was deintercalated. Accordingly, the negative electrode of Example 1 including the conductive flake-shaped graphite maintained capacity during a long cycle-life.

Figure 7:
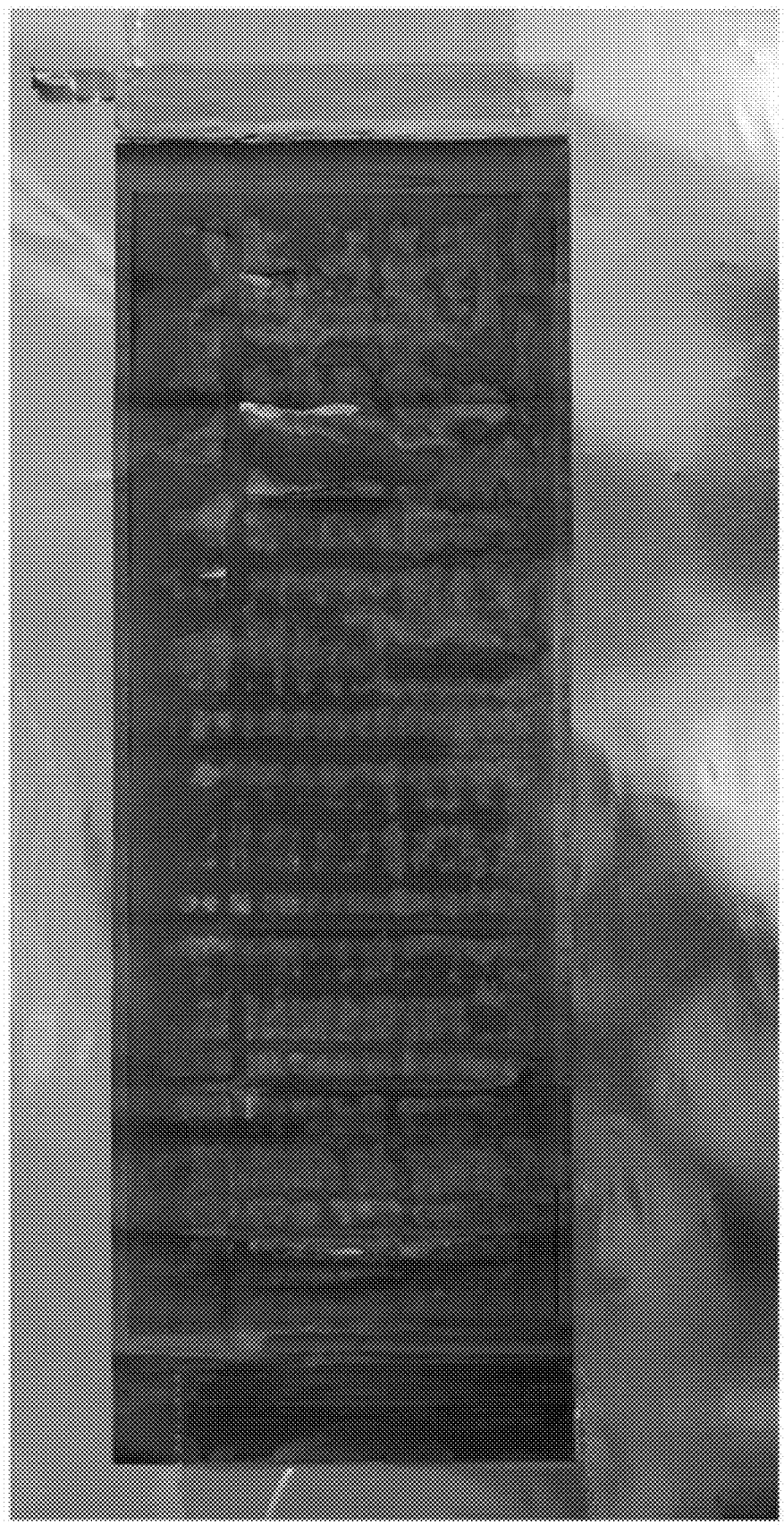
FIG. 7 illustrates an image of the surface of the negative electrode obtained after disassembling the battery according to Comparative Example 1 after charging and discharging.

As shown in FIG. 7, the negative electrode of Comparative Example 1 looked gold, indicating a state wherein lithium was intercalated. Accordingly, referring to the result, the negative electrode was discharged at 0.2 C, but since an electrical contact among the active materials inside the electrode were lost, deintercalation from the charged negative electrode did not occur.

By way of summation and review, a lithium salt dissolved in an organic solvent may be used as an electrolyte of a rechargeable lithium battery. A lithium-transition metal oxide having a structure capable of intercalating lithium ions (such as $LiCoO_2$, $LiMn_2O_4$, $LiNi_{1-x}Co_xO_2$ (0<x<1), and the like) may be used as a positive active material of a rechargeable lithium battery. Various carbon-based materials (including artificial graphite, natural graphite, and hard carbon) capable of intercalating and deintercalating lithium ions or Si-based active materials including Si and Sn may be used for a negative active material for a lithium secondary battery. A high specific capacity of the negative electrode is important for high capacity batteries (high capacity per unit volume). A composite of silicon and carbon has been considered for the negative electrode, although the composite of silicon and carbon may exhibit significant volume changes during charging and discharging.

As described above, embodiments may provides a negative electrode for a rechargeable lithium battery having improved cycle-life characteristics at high temperature and room temperature. Embodiments may provide a negative electrode for a rechargeable lithium battery that exhibits excellent cycle-life characteristics at room temperature and high temperature, and improved storage characteristics at a high temperature.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative electrode for a rechargeable lithium battery, comprising:
   a negative active material layer including a negative active material; and
   a current collector supporting the negative active material layer,
   wherein the negative active material includes:
   first spherical crystalline carbon, the first spherical crystalline carbon including secondary particles in which primary particles of crystalline carbon are assembled, the first spherical crystalline carbon having a coating of crystalline carbon;
   second spherical crystalline carbon, the second spherical crystalline carbon including secondary particles in which primary particles of crystalline carbon are assembled, the second spherical crystalline carbon having a coating of amorphous carbon; and
   flake-shaped graphite.

2. The negative electrode for a rechargeable lithium battery as claimed in claim 1, wherein in the negative active material layer, the flake-shaped graphite is disposed between the first spherical crystalline carbon and the second spherical crystalline carbon, and the first spherical crystalline carbon and the second spherical crystalline carbon are in direct contact with the flake-shaped graphite.

3. The negative electrode for a rechargeable lithium battery as claimed in claim 1, wherein an average particle diameter (D50) of the flake-shaped graphite is about 1 μm to about 10 μm.

4. The negative electrode for a rechargeable lithium battery as claimed in claim 1, wherein an average particle diameter (D50) of the flake-shaped graphite is about 3 μm to about 7 μm.

5. The negative electrode for a rechargeable lithium battery as claimed in claim 1, wherein an amount of the flake-shaped graphite in the negative active material is about 1 wt % to about 10 wt % based on a total weight of the negative active material.

6. The negative electrode for a rechargeable lithium battery as claimed in claim 1, wherein an amount of the first spherical crystalline carbon in the negative active material is about 10 wt % to about 80 wt % based on a total weight of the negative active material.

7. The negative electrode for a rechargeable lithium battery as claimed in claim 1, wherein an amount of the second spherical crystalline carbon in the negative active material is about 10 wt % to about 80 wt % based on a total weight of the negative active material.

8. The negative electrode for a rechargeable lithium battery as claimed in claim 1, wherein an amount of the negative active material in the negative active material layer is about 96 wt % to about 99 wt % based on a total weight of the negative active material layer.

9. The negative electrode for a rechargeable lithium battery as claimed in claim 1, wherein a loading level of the negative active material layer is about 15 mg/cm$^2$ or more.

10. The negative electrode for a rechargeable lithium battery as claimed in claim 1, wherein a loading level of the negative active material layer is about 15 mg/cm$^2$ to about 40 mg/cm$^2$.

11. A rechargeable lithium battery, comprising:
the negative electrode as claimed in claim 1;
a positive electrode including a positive active material; and
a non-aqueous electrolyte.

12. A negative electrode for a rechargeable lithium battery, comprising:
a current collector; and
a negative active material on the current collector, the negative active material including:
flake-shaped graphite;
first particles, the first particles being an assembly of primary particles of crystalline carbon particles, the first particles including a coating of crystalline carbon on the assembled primary particles; and
second particles, the second particles being an assembly of crystalline carbon particles, the second particles including a coating of amorphous carbon on the assembled primary particles.

* * * * *